United States Patent
Zhou et al.

(10) Patent No.: US 9,798,402 B2
(45) Date of Patent: Oct. 24, 2017

(54) TOUCH CONTROL DISPLAY SCREEN AND ELECTRONIC DEVICE

(71) Applicants: Shanghai Tianma Micro-Electronics Co., Ltd., Shanghai (CN); Tianma Micro-Electronics Co., Ltd., Shenzhen (CN)

(72) Inventors: Xingyao Zhou, Shanghai (CN); Fei Li, Shanghai (CN); Yong Yuan, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 69 days.

(21) Appl. No.: 14/691,484

(22) Filed: Apr. 20, 2015

(65) Prior Publication Data

US 2016/0147343 A1    May 26, 2016

(30) Foreign Application Priority Data

Nov. 21, 2014   (CN) .......................... 2014 1 0674369

(51) Int. Cl.
    *G06F 3/041*    (2006.01)
    *G02F 1/1333*    (2006.01)
    *G06F 3/044*    (2006.01)

(52) U.S. Cl.
    CPC ........ *G06F 3/0412* (2013.01); *G02F 1/13338* (2013.01); *G06F 3/044* (2013.01); *G06F 3/0416* (2013.01)

(58) Field of Classification Search
    CPC ...... G06F 3/0412; G06F 3/044; G06F 3/0416; G02F 1/13338
    See application file for complete search history.

(56) References Cited

U.S. PATENT DOCUMENTS

2012/0086879 A1* 4/2012 Yu .................... G06F 3/0412
    349/33
2013/0141343 A1    6/2013 Yu et al.
(Continued)

FOREIGN PATENT DOCUMENTS

| CN | 103472966 A | 12/2013 |
|---|---|---|
| CN | 103576360 A | 2/2014 |
| CN | 103699256 A | 4/2014 |

*Primary Examiner* — Richard Hong
(74) *Attorney, Agent, or Firm* — Anova Law Group, PLLC (57) ABSTRACT

A touch control display screen includes: a touch control electrode layer including a plurality of touch control electrodes; a first electrode layer opposite to the touch control electrode layer and including a plurality of first electrodes; a liquid crystal layer between the touch control electrode layer and the first electrode layer; a switch control circuit connected with at least one touch control electrode; a display control circuit connected with the first electrodes; and a synchronization control circuit connected with the switch control circuit. In the display stage, the display control circuit outputs a first common voltage, and the synchronization control circuit controls the switch control circuit to output a second common voltage equal to the first common voltage. Many advantages are provided, such as a uniform display effect, fewer residual ions, better display quality, higher reliability, simplified circuit, lower cost, and increased light transmittance.

20 Claims, 5 Drawing Sheets

(56) References Cited

U.S. PATENT DOCUMENTS

| | | | |
|---|---|---|---|
| 2013/0335366 A1* | 12/2013 | Lee | G06F 3/044 345/174 |
| 2014/0028616 A1* | 1/2014 | Furutani | G06F 3/044 345/174 |
| 2014/0111446 A1* | 4/2014 | Lee | G06F 3/0416 345/173 |
| 2014/0347318 A1* | 11/2014 | Kim | G06F 3/044 345/174 |
| 2015/0346860 A1* | 12/2015 | Qin | G06F 3/0412 345/174 |
| 2016/0334934 A1* | 11/2016 | Mo | G02F 1/13338 |

* cited by examiner

TOUCH CONTROL DISPLAY SCREEN AND ELECTRONIC DEVICE

CROSS-REFERENCES TO RELATED APPLICATIONS

This application claims the benefit of priority to Chinese Patent Application No. 201410674369.0, filed with the Chinese Patent Office on Nov. 21, 2014 and entitled "TOUCH CONTROL DISPLAY SCREEN AND ELECTRONIC DEVICE", the content of which is incorporated herein by reference in its entirety.

FIELD OF THE DISCLOSURE

The present disclosure generally relates to touch control display technology, and more particularly, to a touch control display screen and an electronic device including the touch control display screen.

BACKGROUND OF THE INVENTION

Recently, touch screens with a touch control function (i.e., touch control display screens) are widely used. According to working principles thereof, touch screens can be classified into resistive touch screens, capacitive touch screens and so on. Capacitive touch screens can support a multi-point touch control. Besides, capacitive touch screens have relatively high light transmittance, low power consumption, and good surface hardness, and thus can have a long operating life.

According to inner structures thereof, touch screens can be classified into add-on mode touch screens, on-cell touch screens and in-cell touch screens. In an in-cell touch screen, touch control electrodes are disposed inside the liquid crystal display screen, thus, the thickness of the whole module is reduced, and the manufacturing cost may be greatly reduced. However, better display quality and higher reliability of the in-cell touch screen are still required.

BRIEF SUMMARY OF THE INVENTION

Embodiments of the present disclosure provide a touch control display screen and an electronic device including the touch control display screen. Compared with conventional touch screens, the touch control display screen of the present disclosure may have better display quality and higher reliability.

Embodiments of the present disclosure provide a touch control display screen. The touch control display screen includes: a touch control electrode layer including a plurality of touch control electrodes; a first electrode layer opposite to the touch control electrode layer, which includes a plurality of first electrodes; a liquid crystal layer disposed between the touch control electrode layer and the first electrode layer; a switch control circuit which is electrically connected with at least one of the plurality of touch control electrodes; a display control circuit which is electrically connected with the plurality of first electrodes; and a synchronization control circuit which is electrically connected with the switch control circuit, where in a display stage, the display control circuit outputs a first common voltage, and the synchronization control circuit controls the switch control circuit to output a second common voltage which is equal to the first common voltage.

Embodiments of the present disclosure also provide an electronic device including the above-described touch control display screen.

DETAILED DESCRIPTION OF THE INVENTION

In order to clarify the objects, characteristics and advantages of the disclosure, embodiments of present disclosure will be described in detail in conjunction with accompanying drawings.

Embodiments of the present disclosure provide a touch control display screen and an electronic device. The touch control display screen includes a touch control electrode layer including a plurality of touch control electrodes; a first electrode layer opposite to the touch control electrode layer, which includes a plurality of first electrodes; a liquid crystal layer disposed between the touch control electrode layer and the first electrode layer; a switch control circuit which is electrically connected with at least one touch control electrode; a display control circuit which is electrically connected with the plurality of first electrodes; and a synchronization control circuit which is electrically connected with the switch control circuit. In a display stage, the display control circuit outputs a first common voltage, and the synchronization control circuit controls the switch control circuit to output a second common voltage. By enabling the second common voltage to be equal to the first common voltage, in the display stage, a voltage difference between the first electrodes and the touch control electrodes may be reduced, and further a voltage difference between two sides of the liquid crystal layer may be reduced. As a result, ions in a cell may not be prone to gather to one side of a substrate, which avoids a non-uniform display effect caused by ions gathering to one side of the substrate, such as a mura problem. Besides, residual ions caused by a bias voltage may be avoided, the display effect of the touch control display screen may not be seriously affected under adverse environments, such as a high temperature condition, a circuit structure may be simplified, the manufacturing cost may be reduced, and light transmittance may be improved. Overall, the performance and the reliability of the touch control display screen may be improved, and the display effect may be enhanced.

The touch control display screen may include a display unit and a touch control unit. In some embodiments, the display unit may be a display panel, such as a liquid crystal display (LCD) panel, or an electronic paper. The touch control unit may be a capacitive touch control unit, an electromagnetic touch control unit or a resistive touch control unit. In an embodiment below, a capacitive touch control unit and a LCD panel are taken as an example to describe a structure and an operating mode of a touch control display screen.

Figure 1:
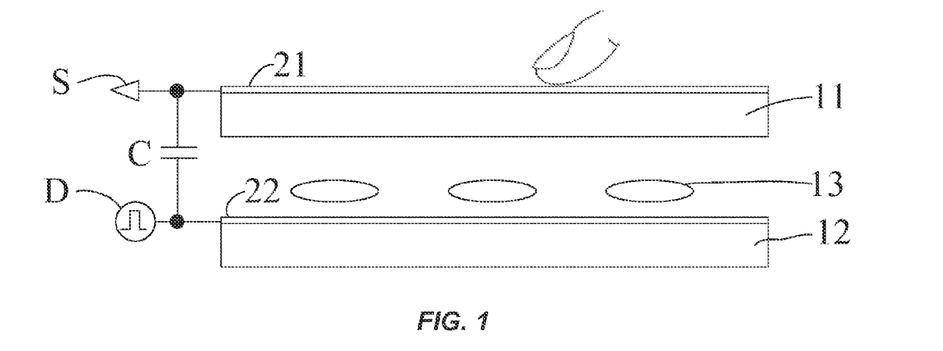
FIG. 1 schematically illustrates a sectional view of a touch control display screen according to an embodiment of the present disclosure.

FIG. 1 schematically illustrates a sectional view of a touch control display screen according to an embodiment of the present disclosure. In some embodiments, the display unit is a LCD panel, including a first substrate 11, a second substrate 12 opposite to the first substrate 11 and a liquid crystal layer 13 disposed between the first and second substrates. In some embodiments, the touch control unit is a mutual capacitive touch control unit, including a first touch control electrode 21 and a second touch control electrode 22. The second touch control electrode 22 may be disposed at an inner side of the second substrate 12 (i.e., the side of the second substrate 12 close to the liquid crystal layer 13), which generally serves as a touch control drive electrode and receives a touch control drive signal D. The first touch control electrode 21 may be disposed at an outer side of the first substrate 11 (i.e., the side of the first substrate 11 facing away from the liquid crystal layer 13), or at an inner side of the first substrate 11 (i.e., the opposite side of the first substrate 11 which is close to the liquid crystal layer 13). The first touch control electrode 21 generally serves as a touch control induction electrode, from which a touch control detection circuit (not shown) may detect a touch control induction signal S. The working theory of drive detection of a mutual capacitive touch control unit is well known to those skilled in the art and will thus only briefly described herein. The first touch control electrode 21 and the second touch control electrode 22 form a capacitance C therebetween. When a finger approaches or touches the touch control unit, an additional capacitance may be generated, thus, the capacitance between the first and second touch control electrodes becomes C'. When the touch control unit is touched, the touch control drive signal is D, and the touch control induction signal is S' which is different from the touch control induction signal S when the touch control unit is not touched. And this may help to determine whether the touch control unit is touched.

It should be noted that the display unit is not limited to the LCD panel, and the touch control unit is not limited to the mutual capacitive touch control unit. In some embodiments, the second touch control electrode 22 may be disposed at the inner side of the first substrate 11 (i.e., the side of the first substrate 11 which is close to the liquid crystal layer 13). In some embodiments, the second touch control electrode 22 may be disposed in a same layer as the first touch control electrode 21 and insulated from the first touch control electrode 21. In some embodiments, the first touch control electrode 21 and the second touch control electrode 22 may be electrode patterns which are independent from each other and do not overlap each other. In some embodiments, the first touch control electrode 21 and the second touch control electrode 22 may be cross-linked and insulated with each other, and disconnected electrodes may be electrically connected by a cross bridge.

Figure 2:
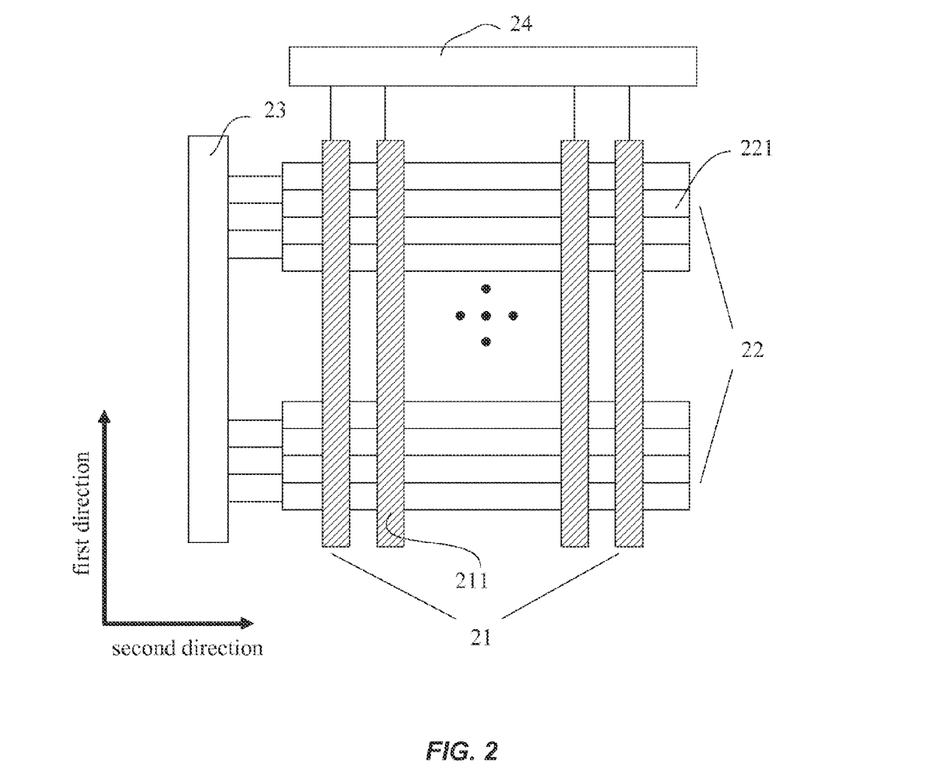
FIG. 2 schematically illustrates a structural diagram of a mutual capacitive touch control unit according to an embodiment of the present disclosure.

FIG. 2 schematically illustrates a structural diagram of a mutual capacitive touch control unit according to an embodiment of the present disclosure. Referring to FIG. 2, the mutual capacitive touch control unit includes a first touch control electrode 21 and a second touch control electrode 22. The first touch control electrode 21 includes a plurality of first touch control sub-electrodes 211. The first touch control sub-electrodes 211 extend along a first direction and are arranged in parallel to each other in a second direction. The mutual capacitive touch control unit further includes a touch control drive circuit 23 and a touch control detection circuit 24. The touch control drive circuit 23 is configured to provide a touch control drive signal to the second touch control electrode 22, and the touch control detection circuit 24 is configured to detect a touch control induction signal from the first touch control electrode 21. In some embodiments, the first direction is perpendicular or substantially perpendicular with the second direction.

Figure 3:
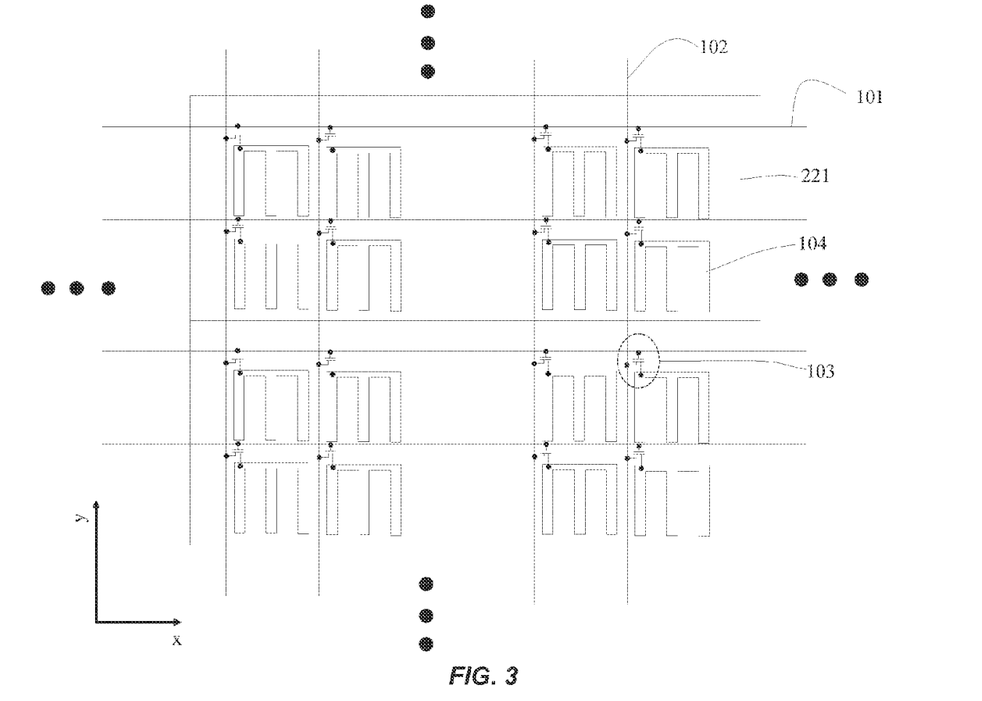
FIG. 3 schematically illustrates a diagram of a pixel array where a first touch control electrode is used as a common electrode and a touch control drive electrode.

In FIG. 1, the second touch control electrode 22 as a touch control drive electrode may reuse an existing structure in the LCD screen. For example, the LCD screen further has a display region, a non-display region, and a pixel array which is disposed in the display region (the inner side of the second substrate 12 in FIG. 1) and between the first substrate 11 and the second substrate 12. The pixel array and the first touch control electrode 21 are arranged opposite to each other, thus, an electric field is formed between the pixel array and the first touch control electrode 21. The second touch control electrode 22 may reuse an existing structure in the pixel array. FIG. 3 illustrates a diagram of a pixel array where a first electrode 22 (i.e., a common electrode) is reused as a touch control drive electrode. Referring to FIG. 3, the pixel array includes a plurality of scanning lines 101, arranged in parallel to each other in the first direction (i.e., Y-axis direction) and extending along the second direction (i.e., X-axis direction), a plurality of data lines 102 arranged in parallel to each other in the X-axis direction and extending along the Y-axis direction, and pixel cells located in pixel regions defined by any two adjacent scanning lines 101 and any two adjacent scanning lines 102. Each pixel cell includes a pixel switch 103, a pixel electrode 104, and a common electrode disposed opposite to the pixel electrode 104. In some embodiments, the pixel switch 103 is a thin-film transistor (TFT), whose gate is electrically connected with the scanning line 101, source is electrically connected with the data line 102, and drain is electrically with the pixel electrode 104. The pixel electrodes 104 in the pixel units are arranged in a matrix to form a plurality of rows and a plurality of columns. Each row of pixel electrodes 104 is parallel to the X-axis direction and each column of pixel electrodes 104 is parallel to the Y-axis direction. The common electrode includes a plurality of second touch control sub-electrodes 221 arranged in parallel to each other in the Y direction and extending along the X direction. Each second touch control sub-electrode 221 may cover one row of pixel cells in the X-axis direction, and cover integral rows of pixel cells or non-integral rows of pixel cells in the Y-axis direction. Referring to FIG. 3, in some embodiments, each second touch control sub-electrode 221 may cover two rows of pixel cells in the Y-axis direction. The first electrode 22 (i.e., the second touch control electrode 22) is used as the common electrode for display and the touch control drive electrode.

Figure 4A:
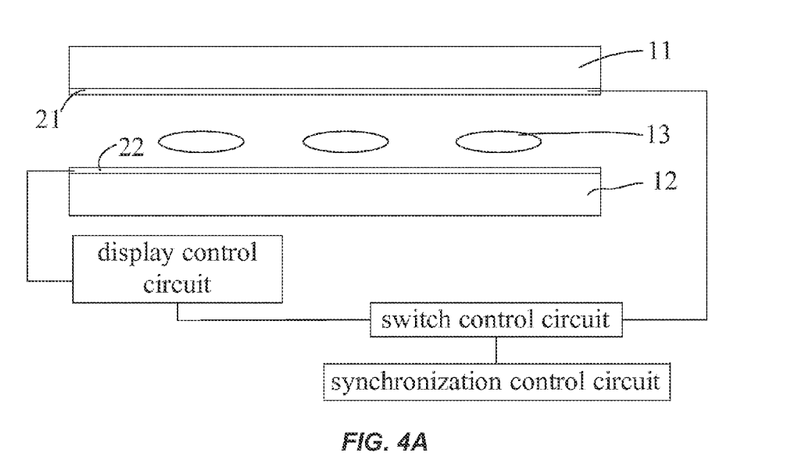
FIG. 4A schematically illustrates a circuit connection diagram according to an embodiment of the present disclosure.

In the above-described embodiments, the first electrode 22 (i.e., the second touch control electrode 22) is used as the common electrode for display and the touch control drive electrode. In some embodiments, the first electrode 22 may only serve as a common electrode for display. In some embodiments, the first electrode 22 may serve as a common electrode for display and a touch control detection electrode. In some embodiments, the first electrode 22 may be located at the inner side of the second substrate 12 (as shown in FIG. 4A), and the first touch control electrode 21 may be located at the inner side (as shown in FIG. 4A) or the outer side (not shown) of the first substrate 11. Other embodiments are also possible.

Figure 4B:
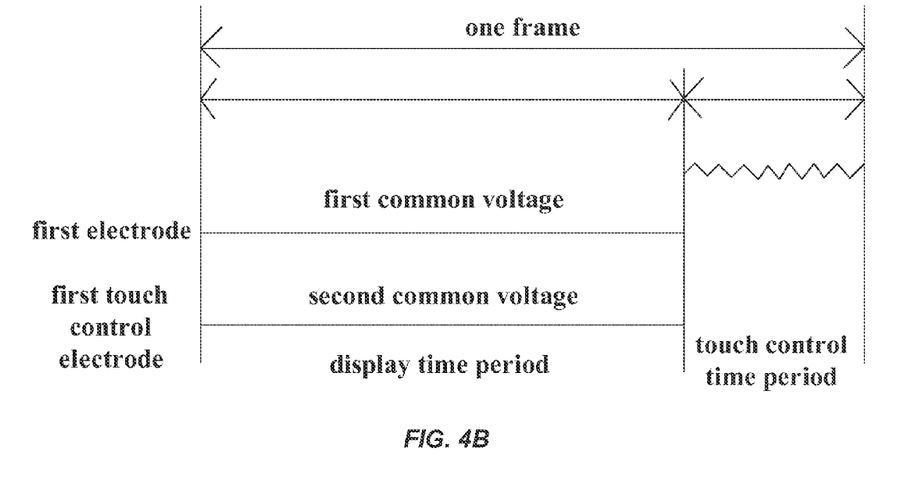
FIG. 4B schematically illustrates a diagram of electrode driving according to an embodiment of the present disclosure.

Referring to FIG. 4B, when the touch control display screen operates, a frame generally includes a touch control time period and a display time period. In some embodiments, during the display time period, a first common voltage is applied to the first electrode 22, and a second common voltage is applied to the first touch control electrode 21, where the first common voltage is equal to the second common voltage. Thus, the first electrode 22 and the first touch control electrode 21 on two sides of the liquid crystal layer 13 receive the same voltage, that is, the two sides have no voltage difference. Ions may not be prone to gather to one side of the substrate after the touch control display screen operates for a long time, which avoids non-uniform display effects caused by ions gathering to one side of the substrate, such as a mura problem. Besides, residual ions caused by a bias voltage may be avoided, display effect of the touch control display screen may not be seriously affected under adverse environments, such as a high temperature condition, and light transmittance may be improved. Overall, the display effect and the reliability of the touch control display screen may be improved. Referring to FIG. 4A, in some embodiments, at least one first touch control electrode 21 is electrically connected with a switch control circuit, and the first electrode 22 is electrically connected with a display control circuit. The touch control display screen further includes a synchronization control circuit which is electrically connected with the switch control circuit. In a display stage, the display control circuit outputs the first common voltage to the first electrode 22, and the synchronization control circuit controls the switch control circuit to output the second common voltage. In a touch control stage, when the first touch control electrodes 21 are touch control drive electrodes, the first touch control electrodes 21 are applied with a touch control drive voltage, and the first electrode 22 (i.e., the common electrode is reused as the touch control detection electrode) outputs a touch control detection signal. When the first touch control electrodes 21 are touch control detection electrodes, the display control circuit applies a touch control drive voltage to the first electrode 22 (i.e., a common electrode is reused as a touch control drive electrode) and the first touch control electrodes 21 output a touch control detection signal. When the first touch control electrodes 21 include touch control drive electrodes and touch control detection electrodes, a portion of the first touch control electrodes 21 are applied with a touch control drive signal, and a portion of the first touch control electrodes 21 are applied with a touch control detection signal, which corresponds to a mutual capacitive detection mode. In some embodiments, the first touch control electrodes 21 serve as both the touch control drive electrode and the touch control detection electrode, which corresponds to a self capacitive detection mode.

Figure 5:
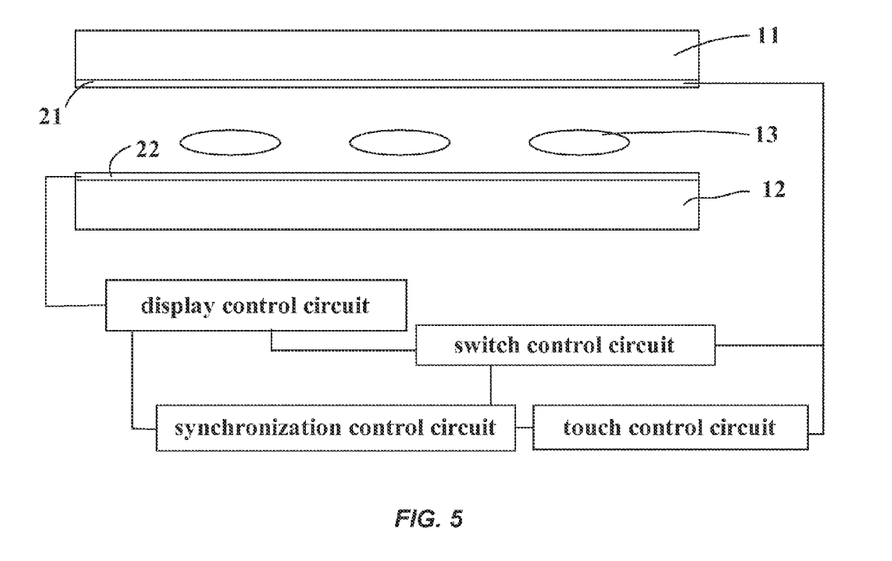
FIG. 5 schematically illustrates a circuit connection diagram according to an embodiment of the present disclosure.

FIG. 5 schematically illustrates a circuit connection diagram of a touch control display screen according to an embodiment of the present disclosure. At least one first touch control electrode 21 is electrically connected with a switch control circuit and a touch control circuit, and the first electrode 22 is electrically connected with a display control circuit. The touch control display screen further includes a synchronization control circuit which is electrically connected with the switch control circuit and the touch control circuit. During a display stage, the display control circuit applies a first common voltage to the first electrode 22, and the synchronization control circuit controls the switch control circuit to apply a second common voltage to the first touch control electrode 21 electrically connected with the switch control circuit, where the first common voltage is equal to the second common voltage. Thus, the first electrode 22 and the first touch control electrode 21 on two sides of a liquid crystal layer 13 are applied with the same voltage, that is, the two sides have no voltage difference. Ions may not be prone to gather to one side of the substrate after the touch control display screen works for a long time, which avoids non-uniform display effect caused by ions gathering to one side of the substrate, such as a mura problem. Besides, residual ions caused by a bias voltage may be avoided, the display effect of the touch control display screen may not be seriously affected under adverse environments, such as a high temperature condition, and light transmittance may be improved. Overall, the display effect and the reliability of the touch control display screen may be improved. During a touch control stage, when the first touch control electrodes 21 are touch control drive electrodes, the first touch control electrodes 21 are applied with a touch control drive voltage by the touch control circuit, and the first electrode 22 (i.e., a common electrode is reused as a touch control detection electrode) outputs a touch control detection signal. When the first touch control electrodes 21 are touch control detection electrodes, the display control circuit applies a touch control drive voltage to the first electrode 22 (i.e., a common electrode is reused as a touch control drive electrode) and the first touch control electrodes 21 output a touch control detection signal. When the first touch control electrodes 21 include touch control drive electrodes and touch control detection electrodes, a portion of the first touch control electrodes 21 are applied with a touch control drive signal, and a portion of the first touch control electrodes 21 are applied with a touch control detection signal, which corresponds to a mutual capacitive detection mode. In some embodiments, the first touch control electrodes 21 serve as both the touch control drive electrode and the touch control detection electrode, which corresponds to a self capacitive detection mode. In some embodiments, the synchronization control circuit may be further electrically connected with the display control circuit. When the display stage ends, the synchronization control circuit may send a synchronization control signal to the touch control circuit, to control the touch control circuit to start touch control operation.

Figure 6:
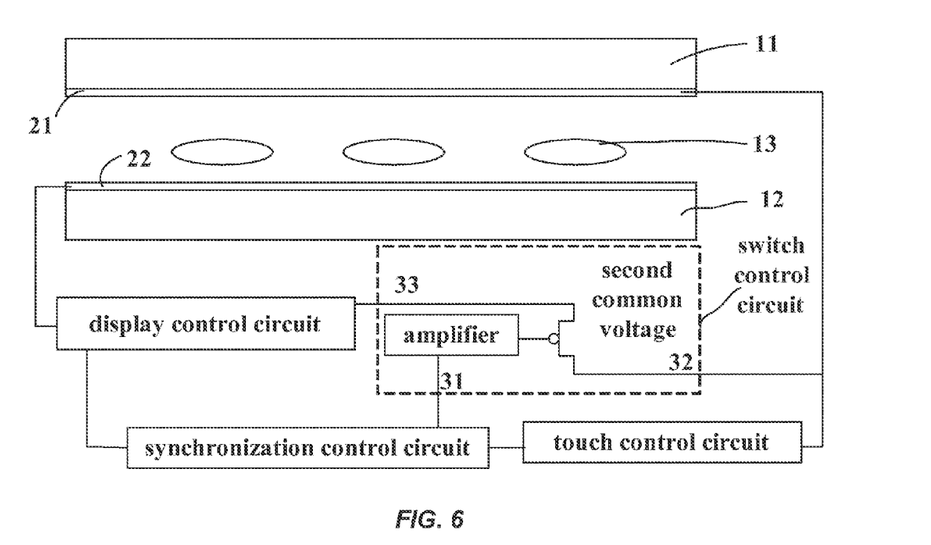
FIG. 6 schematically illustrates a circuit connection diagram according to an embodiment of the present disclosure.

FIG. 6 schematically illustrates a circuit connection diagram of a touch control display screen according to an embodiment of the present disclosure. At least one first touch control electrode 21 is electrically connected with a switch control circuit and a touch control circuit, and the first electrode 22 is electrically connected with a display control circuit. The touch control display screen further includes a synchronization control circuit which is electrically connected with the switch control circuit and the touch control circuit. During a display stage, the display control circuit applies a first common voltage to the first electrode 22, and the synchronization control circuit controls the switch control circuit to apply a second common voltage to the first touch control electrode 21 electrically connected with the switch control circuit, where the first common voltage is equal to the second common voltage. Thus, the first electrode 22 and the first touch control electrode 21 on two sides of a liquid crystal layer 13 are applied with the same voltage, that is, the two sides have no voltage difference. Ions may not be prone to gather to one side of the substrate after the touch control display screen works for a long time, which avoids non-uniform display effect caused by ions gathering to one side of the substrate, such as a mura problem. Besides, residual ions caused by a bias voltage may be avoided, display effect of the touch control display screen may not be seriously affected under adverse environments, such as a high temperature condition, and light transmittance may be improved. Overall, the display effect and the reliability of the touch control display screen may be improved. When the display stage ends, a touch control stage is started. The synchronization control circuit may send a synchronization control signal to the touch control circuit, to control the touch control circuit to start touch control operation. When the first touch control electrodes 21 are touch control drive electrodes, the first touch control electrodes 21 are applied with a touch control drive voltage by the touch control circuit, and the first electrode 22 (i.e., a common electrode is reused as a touch control detection electrode) outputs a touch control detection signal. When the first touch control electrodes 21 are touch control detection electrodes, the display control circuit applies a touch control drive voltage to the first electrode 22 (i.e., a common electrode is reused as a touch control drive electrode), and the first touch control electrodes 21 output a touch control detection signal. When the first touch control electrodes 21 include touch control drive electrodes and touch control detection electrodes, a portion of the first touch control electrodes 21 are applied with a touch control drive signal, and a portion of the first touch control electrodes 21 are applied with a touch control detection signal, which corresponds to a mutual capacitive detection mode. In some embodiments, the first touch control electrodes 21 serve as both the touch control drive electrode and the touch control detection electrode, which corresponds to a self capacitive detection mode.

Referring to FIG. 6, in some embodiments, the switch control circuit may be a switch circuit. The switch circuit switches to an on-state at the touch control stage, and the touch control circuit outputs a touch signal to the touch control electrodes 21. The switch circuit switches to an off-state at the display stage, and output the second common voltage to at least one first touch control electrode 21. In some embodiments, the switch circuit may further include a control terminal 31 electrically connected with the synchronization control circuit, an input terminal 33 electrically connected with the display control circuit, and an output terminal 32 electrically connected with the at least one first touch control electrode 21.

In the above-described embodiments, the synchronization control signal interlinks the touch control stage with the display stage. To further simplify the circuit structure, the synchronization control signal may be reused to control the switch control circuit. The synchronization control signal may serve as a control signal to be transmitted to the control terminal 31 of the switch control circuit. If the touch control display screen is time-division driving, the synchronization control signal may be output from an integrated chip. In the display stage, a voltage may be 0V; and in the touch control stage, the voltage may be 1.8V. Still referring to FIG. 6, in some embodiments, the switch circuit includes at least one P-type TFT. In some embodiments, a channel of the P-type TFT may include low temperature poly-silicon or metallic oxide. An on-state voltage of the P-type TFT is from −8V to −10V. To enable the switch circuit to switch to on-state in the display stage and to reuse the synchronization control signal, an amplifier may be disposed electrically connected with the P-type TFT and the synchronization control circuit. In this manner, the synchronization control signal may be input into the amplifier, and adjusted by a reference value and amplified to reach −8V to −10V there. The amplified voltage should be less than the on-state voltage of the P-type TFT, such that the P-type TFT switches to on-state and outputs the second common voltage to the at least one first touch control electrode 21. In some embodiments, to further simplify the circuit structure, the second common voltage may reuse the first common voltage, that is, the first common voltage may also serve as the second common voltage. Referring to FIG. 6, the input terminal 33 of the switch circuit is electrically connected with the display control circuit. In the display stage, the display control circuit transmits the second common voltage (i.e., the first common voltage) to the at least one first touch control electrode 21 through the input terminal 33.

Figure 7:
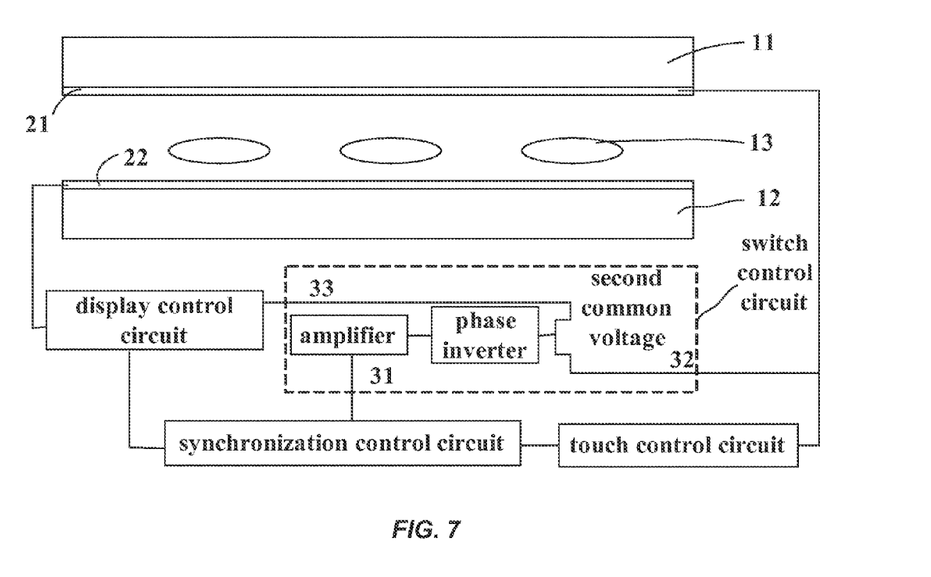
FIG. 7 schematically illustrates a circuit connection diagram according to an embodiment of the present disclosure.

FIG. 7 schematically illustrates a circuit connection diagram of a touch control display screen according to an embodiment of the present disclosure. At least one first touch control electrode 21 is electrically connected with a switch control circuit and a touch control circuit, and the first electrode 22 is electrically connected with a display control circuit. The touch control display screen further includes a synchronization control circuit which is electrically connected with the switch control circuit and the touch control circuit. During a display stage, the display control circuit applies a first common voltage to the first electrode 22, and the synchronization control circuit controls the switch control circuit to apply a second common voltage to the first touch control electrode 21 electrically connected with the switch control circuit, where the first common voltage is equal to the second common voltage. Thus, the first electrode 22 and the first touch control electrode 21 on two sides of a liquid crystal layer 13 are applied with the same voltage, that is, the two sides have no voltage difference. Ions may not be prone to gather to one side of the substrate after the touch control display screen works for a long time, which avoids non-uniform display effect caused by ions gathering to one side of the substrate, such as a mura problem. Besides, the display effect of the touch control display screen may not be seriously affected under adverse environments, such as a high temperature condition, and light transmittance may be improved. Overall, the display effect and the reliability of the touch control display screen may be improved. When the display stage ends, a touch control stage starts. The synchronization control circuit may send a synchronization control signal to the touch control circuit, to control the touch control circuit to start touch control operation. When the first touch control electrodes 21 are touch control drive electrodes, the first touch control electrodes 21 are applied with a touch control drive voltage by the touch control circuit, and the first electrode 22 (i.e., a common electrode is reused as a touch control detection electrode) outputs a touch control detection signal. When the first touch control electrodes 21 are touch control detection electrodes, the display control circuit applies a touch control drive voltage to the first electrode 22 (i.e., a common electrode is reused as a touch control drive electrode), and the first touch control electrodes 21 output a touch control detection signal. When the first touch control electrodes 21 include touch control drive electrodes and touch control detection electrodes, a portion of the first touch control electrodes 21 are applied with a touch control drive signal, and a portion of the first touch control electrodes 21 are applied with a touch control detection signal, which corresponds to a mutual capacitive detection mode. In some embodiments, the first touch control electrodes 21 serve as both the touch control drive electrode and the touch control detection electrode, which corresponds to a self capacitive detection mode.

Referring to FIG. 7, in some embodiments, the switch control circuit may be a switch circuit. The switch circuit switches to on-state at the touch control stage, and the touch control circuit outputs a touch signal to the touch control electrodes 21. The switch circuit switches to off-state at the display stage, and output the second common voltage to at least one first touch control electrode 21. In some embodiments, the switch circuit may further include a control terminal 31 electrically connected with the synchronization control circuit, an input terminal 33 electrically connected with the display control circuit, and an output terminal 32 electrically connected with the at least one first touch control electrode 21.

In above embodiments, the synchronization control signal interlinks the touch control stage with the display stage. To further simplify the circuit structure, the synchronization control signal may be reused to control the switch control circuit. The synchronization control signal may serve as a control signal to be transmitted to the control terminal 31 of the switch control circuit. If the touch control display screen is time-division driving, the synchronization control signal may be output from an integrated chip. In the display stage, a voltage may be 0V; and in the touch control stage, the voltage may be 1.8V. Still referring to FIG. 7, in some embodiments, the switch circuit includes at least one N-type TFT. In some embodiments, a channel of the N-type TFT may include low temperature poly-silicon or metallic oxide. An on-state voltage of the N-type TFT is from 10V to 15V. To enable the switch circuit to switch to on-state in the display stage and to reuse the synchronization control signal, an inverting amplifier (for example, a phase inverter and an amplifier) may be disposed electrically connected with the N-type TFT and the synchronization control circuit. In this manner, the synchronization control signal may be input into the inverting amplifier, and adjusted by a reference value and invertedly amplified to reach 10V to 15V there. The amplified voltage should be greater than the on-state voltage of the N-type TFT, such that the N-type TFT switches to on-state and outputs the second common voltage to the at least one first touch control electrode 21. In some embodiments, to further simplify the circuit structure, the second common voltage may reuse the first common voltage, that is, the first common voltage may also serve as the second common voltage. Referring to FIG. 7, the input terminal 33 of the switch circuit is electrically connected with the display control circuit. In the display stage, the display control circuit transmits the second common voltage (i.e., the first common voltage) to the at least one first touch control electrode 21 through the input terminal 33.

Figure 8:
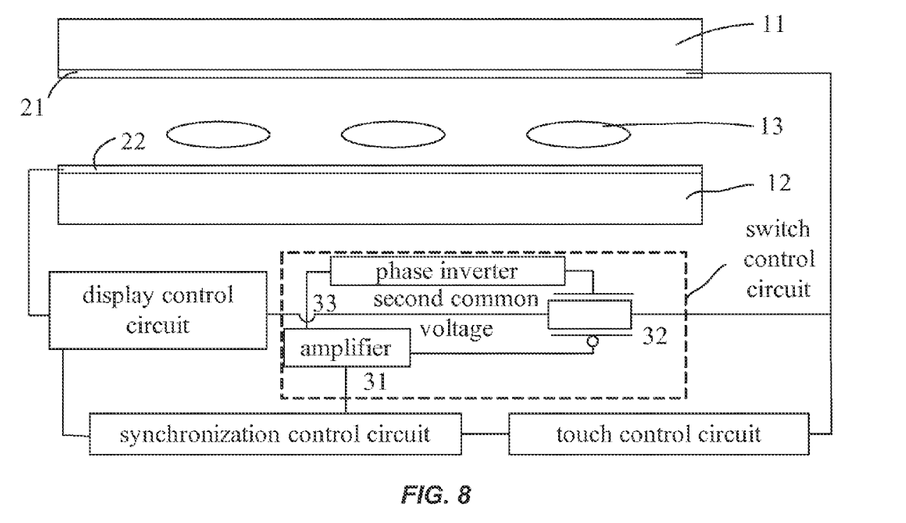
FIG. 8 schematically illustrates a circuit connection diagram according to an embodiment of the present disclosure.

FIG. 8 schematically illustrates a circuit connection diagram of a touch control display screen according to an embodiment of the present disclosure. At least one first touch control electrode 21 is electrically connected with a switch control circuit and a touch control circuit, and the first electrode 22 is electrically connected with a display control circuit. The touch control display screen further includes a synchronization control circuit which is electrically connected with the switch control circuit and the touch control circuit. During a display stage, the display control circuit applies a first common voltage to the first electrode 22, and the synchronization control circuit controls the switch control circuit to apply a second common voltage to the first touch control electrode 21 electrically connected with the switch control circuit, where the first common voltage is equal to the second common voltage. Thus, the first electrode 22 and the first touch control electrode 21 on two sides of a liquid crystal layer 13 are applied with the same voltage, that is, the two sides have no voltage difference. Ions may not be prone to gather to one side of the substrate after the touch control display screen works for a long time, which avoids non-uniform display effect caused by ions gathering to one side of the substrate, such as a mura problem. Besides, display effect of the touch control display screen may not be seriously affected under bad environment, such as a high temperature condition, and light transmittance may be improved. Overall, the display effect and the reliability of the touch control display screen may be improved. When the display stage ends, a touch control stage is started. The synchronization control circuit may send a synchronization control signal to the touch control circuit, to control the touch control circuit to start touch control operation. When the first touch control electrodes 21 are touch control drive electrodes, the first touch control electrodes 21 are applied with a touch control drive voltage by the touch control circuit, and the first electrode 22 (i.e., a common electrode is reused as a touch control detection electrode) outputs a touch control detection signal. When the first touch control electrodes 21 are touch control detection electrodes, the display control circuit applies a touch control drive voltage to the first electrode 22 (i.e., a common electrode is reused as a touch control drive electrode), and the first touch control electrodes 21 output a touch control detection signal. When the first touch control electrodes 21 include touch control drive electrodes and touch control detection electrodes, a portion of the first touch control electrodes 21 are applied with a touch control drive signal, and a portion of the first touch control electrodes 21 are applied with a touch control detection signal, which corresponds to a mutual capacitive detection mode. In some embodiments, the first touch control electrodes 21 serve as both the touch control drive electrode and the touch control detection electrode, which corresponds to a self capacitive detection mode.

Referring to FIG. 8, in some embodiments, the switch control circuit may be a switch circuit. The switch circuit switches to on-state at the touch control stage, and the touch control circuit outputs a touch signal to the touch control electrodes 21. The switch circuit switches to off-state at the display stage, and output the second common voltage to at least one first touch control electrode 21. In some embodiments, the switch circuit may further include a control terminal 31 electrically connected with the synchronization control circuit, an input terminal 33 electrically connected with the display control circuit, and an output terminal 32 electrically connected with the at least one first touch control electrode 21.

In the above-described embodiments, the synchronization control signal interlinks the touch control stage with the display stage. To further simplify the circuit structure, the synchronization control signal may be reused to control the switch control circuit. The synchronization control signal may serve as a control signal to be transmitted to the control terminal 31 of the switch control circuit. If the touch control display screen is time-division driving, the synchronization control signal may be output from an integrated chip. In the display stage, a voltage may be 0V; and in the touch control stage, the voltage may be 1.8V. Still referring to FIG. 8, in some embodiments, the switch circuit includes at least one transmission gate, the transmission gate including at least one P-type TFT and at least one N-type TFT. In some embodiments, channels of the P-type TFT and the N-type TFT may include low temperature poly-silicon or metallic oxide. An on-state voltage of the N-type TFT is from 10V to 15V, and an on-state voltage of the P-type TFT is from −8V to −10V. To enable the switch circuit to switch to on-state in the display stage and to reuse the synchronization control signal, the synchronization control signal may be divided into two branches. To simplify the circuit structure, the synchronization control signal may be first input into an amplifier and then divided into two branches. In a first branch, a phase inverter may be disposed electrically connected with the N-type TFT and the synchronization control circuit. In this manner, the synchronization control signal is input into the amplifier and the phase inverter, and adjusted by a first reference value and invertedly amplified to reach 10V to 15V there. The amplified voltage should be greater than the on-state voltage of the N-type TFT. In a second branch, the amplifier is directly connected with the P-type TFT. In this manner, the synchronization control signal is input into the amplifier, and adjusted by a second reference value and amplified to reach −8V to −10V there. The amplified voltage should be less than the on-state voltage of the P-type TFT, such that the P-type TFT switches to on-state and outputs the second common voltage to the at least one first touch control electrode 21. In some embodiments, to further simplify the circuit structure, the second common voltage may reuse the first common voltage, that is, the first common voltage may also serve as the second common voltage. Referring to FIG. 8, the input terminal 33 of the switch circuit is electrically connected with the display control circuit. In the display stage, the display control circuit transmits the second common voltage (i.e., the first common voltage) to the at least one first touch control electrode 21 through the input terminal 33.

It should be noted that, in some embodiments, at least a portion of the display control circuit, the switch control circuit, the synchronization control circuit and the touch control circuit may be located on the first substrate, the second substrate or a flexible printed circuit board, or in an integrated circuit chip.

In some embodiments, the touch control display screen may be an electronic paper. The switch circuit may be a metal oxide semiconductor field effect transistor (MOSFET), a triode or a transmission gate. A channel of components in the switch circuit may include amorphous silicon, low temperature poly-silicon or oxide semiconductor. A pixel structure may be a top common electrode structure or a bottom common electrode structure.

Figure 9:
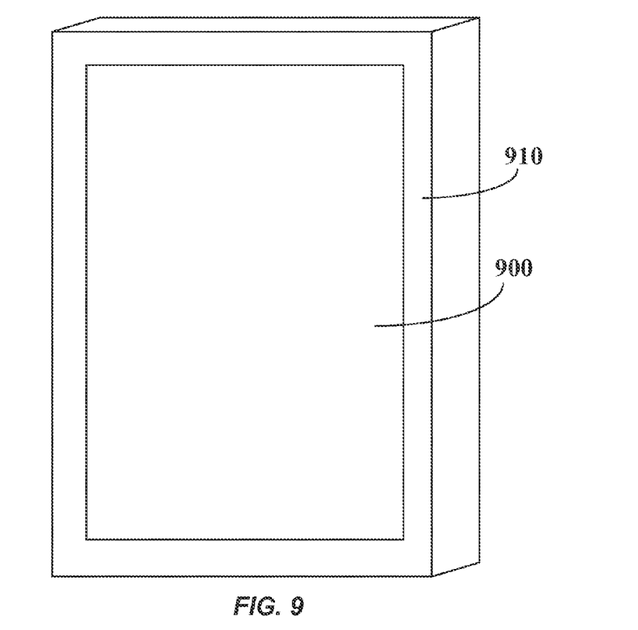
FIG. 9 schematically illustrates an electronic device according to an embodiment of the present disclosure.

Referring to FIG. 9, an electronic device is provided, which includes a touch control display screen 900 provided in any one of the above-described embodiments and a shell 910. The electronic device may be a display of any kind of electronic products, such as a display of a desktop computer, a laptop or a tablet computer, or a display screen of a mobile phone or a television.

As the electronic device is provided with the touch control display screen 900, it may have at least one of the following advantages, such as a more uniform display effect, no residual ions caused by a bias voltage, better display quality and higher reliability, increased light transmittance with unaffected touch control performance, relatively low manufacturing cost and simple manufacture process.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure. Therefore, the protection scope of the present disclosure is subject to the scope defined by the claims.

What is claimed is:

1. A touch control display screen, comprising:
    a touch control electrode layer comprising a plurality of touch control electrodes;
    a first electrode layer opposite to the touch control electrode layer and comprising a plurality of first electrodes;
    a liquid crystal layer disposed between the touch control electrode layer and the first electrode layer;
    a switch control circuit electrically connected with at least one touch control electrode, the switch control circuit comprising an amplifying circuit and a switch circuit, wherein the amplifying circuit directly turns on or off the switch circuit;
    a touch control circuit electrically connected with at least one touch control electrode;
    a display control circuit electrically connected with the plurality of first electrodes and electrically coupled to the switch circuit; and
    a synchronization control circuit electrically connected with the switch control circuit and the touch control circuit and providing a synchronization control signal to the amplifying circuit and the touch control circuit, wherein the switch control circuit connects the display control circuit with the plurality of touch control electrodes when the amplifying circuit turns on the switch circuit,
    wherein in a display stage, the display control circuit outputs a first common voltage to the first electrode layer, and the synchronization control circuit controls the switch control circuit to output a second common voltage equal to the first common voltage; and
    in a touch control stage, the synchronization control circuit controls the touch control circuit to provide a touch control drive voltage to the at least one touch control electrode, and the first electrode layer outputs a touch control detection signal, so that the first electrode layer is reused as a common electrode in the display stage and as a touch control detection electrode in the touch control stage.

2. The touch control display screen according to claim 1, further comprising
    a touch control circuit electrically connected with the at least one touch control electrode and the synchronization control circuit, wherein in a touch control stage, the synchronization control circuit controls the touch control circuit to output a touch control signal.

3. The touch control display screen according to claim 2, wherein the synchronization control circuit is configured to output the synchronization control signal, wherein in the display stage, the display control circuit outputs the first common voltage, and the synchronization control signal controls the switch control circuit to output the second common voltage; and in the touch control stage, the synchronization control signal controls the touch control circuit to output the touch control signal.

4. The touch control display screen according to claim 3, wherein the switch circuit is switched to an on-state in the display stage and is switched to an off-state in the touch control stage.

5. The touch control display screen according to claim 4, wherein the switch circuit comprises a control terminal electrically connected with the synchronization control circuit and configured to receive the synchronization control signal, an input terminal electrically connected with the display control circuit, and an output terminal electrically connected with the at least one touch control electrode.

6. The touch control display screen according to claim 5, wherein the amplifying circuit comprises
an amplifier or an inverting amplifier electrically connected with the control terminal of the switch circuit and the synchronization control circuit.

7. The touch control display screen according to claim 6, wherein the switch circuit comprises a thin film transistor, a metal oxide semiconductor field effect transistor, a triode or a transmission gate.

8. The touch control display screen according to claim 2, wherein the plurality of touch control electrodes comprise a plurality of touch control drive electrodes and a plurality of touch control detection electrodes, the touch control circuit comprises a touch control drive circuit and a touch control detection circuit, the touch control drive circuit is electrically connected to the plurality of touch control drive electrodes, and the touch control detection circuit is electrically connected to the plurality of touch control detection electrodes.

9. The touch control display screen according to claim 2, wherein the plurality of touch control electrodes comprise a plurality of touch control drive electrodes, and the plurality of first electrodes receive the first common voltage in the display stage and output a touch control detection signal in the touch control stage.

10. The touch control display screen according to claim 2, wherein the plurality of touch control electrodes comprise a plurality of touch control detection electrodes, and the plurality of first electrodes receive the first common voltage in the display stage and receive a touch control drive voltage in the touch control stage.

11. The touch control display screen according to claim 1, further comprising
a first substrate and a second substrate opposite to the first substrate, wherein the plurality of touch control electrodes are located on a first side of the first substrate which is close to the liquid crystal layer or on a second side of the first substrate which is opposite to the first side, and the plurality of first electrodes are located on a side of the second substrate which is close to the liquid crystal layer.

12. The touch control display screen according to claim 11, further comprising
a display region and a non-display region, wherein the display region comprises a pixel array, and the pixel array and the plurality of first electrodes form an electric field.

13. The touch control display screen according to claim 11, wherein at least a portion of the switch control circuit is located on the first substrate, the second substrate, or a flexible printed circuit board, or in an integrated circuit chip.

14. An electronic device, comprising a touch control display screen, wherein the touch control display screen comprises:
a touch control electrode layer comprising a plurality of touch control electrodes;
a first electrode layer opposite to the touch control electrode layer and comprising a plurality of first electrodes;
a liquid crystal layer disposed between the touch control electrode layer and the first electrode layer;
a switch control circuit electrically connected with at least one of the plurality of touch control electrodes, the switch control circuit comprising an amplifying circuit and a switch circuit, wherein the amplifying circuit directly turns on or off the switch circuit;
a touch control circuit electrically connected with at least one touch control electrode;
a display control circuit electrically connected with the plurality of first electrodes and electrically coupled to the switch circuit; and
a synchronization control circuit electrically connected with the switch control circuit and the touch control circuit and providing a synchronization control signal to the amplifying circuit and the touch control circuit, wherein the switch control circuit connects the display control circuit with the plurality of touch control electrodes when the amplifying circuit turns on the switch circuit,
wherein in a display stage, the display control circuit outputs a first common voltage to the first electrode layer, and the synchronization control circuit controls the switch control circuit to output a second common voltage equal to the first common voltage; and
in a touch control stage, the synchronization control circuit controls the touch control circuit to provide a touch control drive voltage to the at least one touch control electrode, and the first electrode layer outputs a touch control detection signal, so that the first electrode layer is reused as a common electrode in the display stage and as a touch control detection electrode in the touch control stage.

15. The electronic device according to claim 14, wherein the touch control display screen further comprises a touch control circuit electrically connected with at least one touch control electrode and the synchronization control circuit, wherein in a touch control stage, the synchronization control circuit controls the touch control circuit to output a touch control signal.

16. The electronic device according to claim 15, wherein the synchronization control circuit is configured to output the synchronization control signal, wherein in the display stage, the display control circuit outputs the first common voltage, and the synchronization control signal controls the switch control circuit to output the second common voltage; and in the touch control stage, the synchronization control signal controls the touch control circuit to output the touch control signal.

17. The electronic device according to claim 16, wherein the switch circuit is switched to on-state in the display stage and is switched to off-state in the touch control stage.

18. The electronic device according to claim 17, wherein the switch circuit comprises a control terminal electrically connected with the synchronization control circuit and configured to receive the synchronization control signal, an input terminal electrically connected with the display control circuit, and an output terminal electrically connected with the at least one touch control electrode.

19. The electronic device according to claim 18, wherein the amplifying circuit comprises an amplifier or an inverting amplifier electrically connected with the control terminal of the switch circuit and the synchronization control circuit.

20. The electronic device according to claim 15, wherein the plurality of touch control electrodes comprise a plurality of touch control drive electrodes and a plurality of touch control detection electrodes, the touch control circuit comprises a touch control drive circuit and a touch control detection circuit, the touch control drive circuit is electrically connected to the plurality of touch control drive electrodes, and the touch control detection circuit is electrically connected to the plurality of touch control detection electrodes;
   or, the plurality of touch control electrodes comprise a plurality of touch control drive electrodes, and the plurality of first electrodes receive the first common voltage in the display stage and output a touch control detection signal in the touch control stage;
   or, the plurality of touch control electrodes comprise a plurality of touch control detection electrodes, and the plurality of first electrodes receive the first common voltage in the display stage and receive a touch control drive voltage in the touch control stage.

* * * * *